US012443926B1

(12) United States Patent
D'Silva et al.

(10) Patent No.: US 12,443,926 B1
(45) Date of Patent: Oct. 14, 2025

(54) MACHINE LEARNING BASED SYSTEMS AND METHODS FOR AUTOMATICALLY CLASSIFYING DIGITAL CALENDAR EVENTS

(71) Applicant: MCKINSEY & COMPANY, INC., New York, NY (US)

(72) Inventors: Vijay D'Silva, Scarsdale, NY (US); Tobias Bitzer, Stuttgart (DE)

(73) Assignee: MCKINSEY & COMPANY, INC., New York, NY (US)

( * ) Notice: Subject to any disclaimer, the term of this patent is extended or adjusted under 35 U.S.C. 154(b) by 357 days.

(21) Appl. No.: 17/591,124

(22) Filed: Feb. 2, 2022

(51) Int. Cl.
*G06Q 10/1093* (2023.01)
(52) U.S. Cl.
CPC .................... *G06Q 10/1095* (2013.01)
(58) Field of Classification Search
USPC .......................................................... 705/7.19
See application file for complete search history.

(56) References Cited

U.S. PATENT DOCUMENTS

| 8,630,885 | B2* | 1/2014 | Klausmeier | G06Q 10/109 707/951 |
| 2012/0054642 | A1* | 3/2012 | Balsiger | G06Q 10/10 715/752 |
| 2012/0084286 | A1* | 4/2012 | Hubner | G06Q 10/1093 707/E17.089 |
| 2013/0018651 | A1* | 1/2013 | Djordjevic | G06Q 10/00 704/9 |
| 2015/0347980 | A1* | 12/2015 | White | G06Q 10/1095 705/7.19 |
| 2017/0147941 | A1* | 5/2017 | Bauer | G06N 20/10 |
| 2017/0178080 | A1* | 6/2017 | Abebe | G06Q 10/1095 |
| 2018/0300664 | A1* | 10/2018 | Ni | G06F 40/279 |
| 2019/0266573 | A1* | 8/2019 | Radhakrishnan | G06Q 10/1095 |
| 2020/0042949 | A1* | 2/2020 | Johnson, III | G06Q 10/1097 |
| 2020/0110996 | A1* | 4/2020 | Bhageria | G06F 16/355 |
| 2020/0242564 | A1* | 7/2020 | Causey, Jr. | G06Q 10/1053 |

FOREIGN PATENT DOCUMENTS

CN 112287996 B * 3/2023 ........... G06K 9/6268

OTHER PUBLICATIONS

Kim, Donghyeon, et al. "Learning user preferences and understanding calendar contexts for event scheduling." Proceedings of the 27th ACM International Conference on Information and Knowledge Management. 2018. (Year: 2018).*

* cited by examiner

*Primary Examiner* — Kristin E Gavin
(74) *Attorney, Agent, or Firm* — MARSHALL, GERSTEIN & BORUN LLP; Randall G. Rueth

(57) ABSTRACT

Machine learning based systems and methods are disclosed herein for automatically classifying digital calendar events. A calendar tracking application (app) receives a first set of digital calendar data of a first period. A machine learning model may generate classification data comprising the first set of digital calendar data classified according to predefined meeting categorie(s). The machine learning based system and methods provide various benefits, including: (1) categorizing one or more user digital calendars into multiple pre-defined categories and reporting these in a GUI based dashboard; (2) using a machine learning based model trained on categorized data (as opposed to mechanistic rules only) to improve the predictive accuracy of the categorization; and (3) using the combination of machine learning based model and mechanistic rules to automate the categorization.

18 Claims, 9 Drawing Sheets

Example Label Data (Predefined Meeting Categories)

| Category (Model-1) | Clean_Category | Examples |
|---|---|---|
| For_Client | #for_client (CST time) | Regular CST calls, CST strategy mtgs, preparation e.g., for LOPS |
|  | #for_client (problem solving) | Internal problem solving for ongoing engagements |
| LND | #development&learning | Recruiting, developmental feedback, trainings, mentoring, etc. |
| Me_Time | #family&friends | Dinner with SO, kids' bedtime, etc. |
|  | #health&well-being | Time for exercise, sports, meditation, with pet and other 'me-time' |
|  | #personal | Personal Appointments, Keep Free |
|  | #thinking-time | Time blocked for thinking and reflection, free of meetings |
| Practice | #knowledge_development | Creation of know documents, internal research, publications, etc. |
|  | #practice&function | ORG practice calls, GEM leadership call, etc. |
| Travel | #travel&transit | Taxi to airport, flights, trains, change of buildings at the client, etc. |
| With_Client | #with_client (development) | LoPs, CxO mtgs, etc. for prospective clients/engagements |
|  | #with_client (engagement) | SteerCos, CxO mtgs, Client Dinner, etc. for ongoing engagement |
| Evaluation | #evaluation | Evaluation, people committees (incl. preparation), etc. |
| Firm & Office | #governance | OpCo & other governing committees, partnership meetings etc. |
|  | #office&initiatives | Office partner mtgs, Office townhalls, All-in meeting, Experience |

FIG. 2A

Example Feature Data (Digital Calendar Data)

| Feature | Description | Gain |
|---|---|---|
| N_ATTD_COMPANY_EMAIL | Number of attendees with Company email | 20.2% |
| N_ATTND_W_CLIENT_EMAIL | Number of attendees with client email | 17.0% |
| N_ATTND_FSP | # of attendee(s) from Company FSP cohort | 6.3% |
| Feedback | Keyword | 5.2% |
| duration minutes | Meeting duration in minutes | 5.1% |
| N_ATTND_CSP | # of attendee(s) from Company CSP cohort | 4.6% |
| N_ATTND | Total number of attendees | 3.9% |
| N_ATTND_IB6 | # of attendee(s) from Company (Band 6 employees) | 2.6% |
| START_Hour | Meeting start hour | 2.1% |
| N_ATTND_Partner | Number of Partners attending the meeting | 1.9% |

FIG. 2B

MACHINE LEARNING BASED SYSTEMS AND METHODS FOR AUTOMATICALLY CLASSIFYING DIGITAL CALENDAR EVENTS

FIELD

The present disclosure generally relates to machine learning based systems and methods, and more particularly to, machine learning based tracking systems and methods for automatically classifying digital calendar events.

BACKGROUND

Big data systems regularly store enterprise data, such as calendar, email, and contact data of individuals regarding a given organization. Such data can include terabytes of information and can range over different periods of time. Accordingly, analyzing and tracking such information using manual means, or conventional technologies, can be problematic at least because traditional methods cannot only be resource intensive, but also error prone.

For the foregoing reasons, there is a need for machine learning based systems and methods for automatically classifying or predicting digital calendar events, as further described herein.

SUMMARY

Generally, as described herein, machine learning based systems and methods are described for automatically classifying or predicting digital calendar events of an enterprise big data system. Such machine learning based systems and methods provide an artificial intelligence-based solution for overcoming problems that arise from big data platforms involving enterprise level data. For example, the machine learning based systems and methods described herein may be used to make accurate predictions and/or classifications of enterprise data (e.g., calendar event data or otherwise calendar data). For example, calendar data (any of past, present, or future schedule data) may be used to train a machine learning model to output predictions or classifications of enterprise synced or networked data. This may include, by way of non-limiting example, use of XGBoost-based multiclass classification and/or hard-coded rules some rules to improve categorization, identification, or prediction of big data systems as described herein.

The algorithms or methods herein, regarding AI model training and usage (e.g., model flow) may be fully automated, e.g., not requiring regular manual intervention, and may be routinely executed, for example, on a periodic basis. For example, in various aspects the model flow may involve fetching calendar data from a data source (e.g., SNOWFLAKE data source or database) after a periodic (e.g., weekly) update of calendar data, determining or generating feature data from the calendar data, training a machine learning model, outputting classification or prediction of categories or otherwise results, and generating a results table, or other data structure (e.g., a data view), for uploading, pushing, or pulling, or otherwise providing to a display on end user devices (e.g., computing devices).

Machine learning models trained and used with the system and methods described herein have yielded scalability, increase efficiency and, provide an improved automated solution with a high accuracy (80% and above accuracy). The machine learning models have been used to classify and/or predict a meeting category using information of calendar event data (e.g., meeting invites, domain names, which can be domain names for external emails) from individual calendars (e.g., Outlook calendars) of registered users. In this way, the systems and methods provided herein provide a digital tool that may be used to analyze how users spend their time based on calendar data (e.g., calendar bookings). This digital tool supports both an understanding of current baseline time utilization as well as in setting future aspirations for time spent by the various meeting categories (e.g., Engagement meetings with clients, Client counselling, Team PS, Mentoring, Evaluation, etc.) as used for the machine learning model and as determined by meeting participants, rules, or other machine learning models as described herein.

More specifically, as described herein, a machine learning based system is disclosed. The machine learning based system is configured to automatically classify digital calendar events. The machine learning based system may comprise one or more processors, and a computer memory communicatively coupled to the one or more processors. The machine learning based system may further comprise a calendar tracking application (app) stored in the computer memory and comprising computing instructions configured to execute on the one or more processors. The machine learning based system may further comprise a machine learning model stored on the computer memory and accessible to the calendar tracking app. The machine learning model may be trained with predefined meeting categories as training label data and a plurality digital calendar events as training feature data. Further, the computing instructions of the calendar tracking app, when executed by the one or more processors, may cause the one or more processors to receive a first set of digital calendar data of a first period. The computing instructions of the calendar tracking app, when executed by the one or more processors, may further cause the one or more processors to generate, with the machine learning model, classification data. The classification data may comprise the first set of digital calendar data classified according to one or more of the predefined meeting categories. The computing instructions of the calendar tracking app, when executed by the one or more processors, may further cause the one or more processors to generate a data view based on the classification data. The computing instructions of the calendar tracking app, when executed by the one or more processors, may further cause the one or more processors to provide the data view to a computing device for rendering a graphic user interface (GUI) on a display of the computing device.

In addition, as described herein, a machine learning based method is disclosed for automatically classifying digital calendar events. The machine learning based method may comprise receiving, at a calendar tracking application (app) executing on one or more processors, a first set of digital calendar data of a first period. The machine learning based method may further comprise generating, with a machine learning model, classification data. The classification data may comprise the first set of digital calendar data classified according to one or more predefined meeting categories. The machine learning model may be trained with the one or more predefined meeting categories as training label data and a plurality digital calendar events as training feature data. The machine learning based method may further comprise generating a data view based on the classification data. The machine learning based method may further comprise providing the data view to a computing device for rendering a graphic user interface (GUI) on a display of the computing device.

Further, as described herein, a tangible, non-transitory computer-readable medium storing instructions for automatically classifying digital calendar events is disclosed. The instructions, when executed by one or more processors, may cause the one or more processors to receive a first set of digital calendar data of a first period. The instructions, when executed by one or more processors, may further cause the one or more processors to generate, with a machine learning model, classification data. The classification data may comprise the first set of digital calendar data classified according to one or more predefined meeting categories. The machine learning model may be trained with the one or more predefined meeting categories as training label data and a plurality digital calendar events as training feature data. The instructions, when executed by one or more processors, may further cause the one or more processors to generate a data view based on the classification data. The instructions, when executed by one or more processors, may further cause the one or more processors to provide the data view to a computing device for rendering a graphic user interface (GUI) on a display of the computing device.

The present disclosure relates to improvements to other technologies or technical fields at least because the present disclosure describes or introduces improvements to computing devices in the machine learning and modeling field, where machine learning model is trained with predefined meeting categories as training label data and a plurality digital calendar events as training feature data, each as pulled or otherwise provided from a calendar data or calendar event database. The machine learning model provides predictive and/or classification accuracy of over 80 percent.

In addition, systems and methods as described herein are configured to operate using a reduced processing and/or memory, and thus can operate on limited compute and memory devices, including mobile devices. For example, the machine learning model may generate or output one or more data views based on the calendar data. A data view may be configured as a lightweight (i.e., small memory size) data object configured for transmission over a computer network, thereby reducing network congestion. In addition, the small memory size of the lightweight data view also reduces the required memory and required processor utilization of a client device to read or analyze in rendering the data of the data view on the user computing device or client device. The systems and methods herein divide and assign compute intensive tasks to server(s), including execution of a compute intensive predefined queries on servers that creates streamlined data view(s) to be pushed or pulled to or from a client app executing on a client device or otherwise user computing device having less processor or memory resources. Such reduction frees up the computational resources of an underlying computing system, thereby making it more efficient.

Still further, the present disclosure relates to improvement to other technologies or technical fields at least because the present disclosure describes or introduces improvements to computing devices in the field of security and/or data processing, where, at least in some aspects, digital calendar data or calendar event data includes personal identifiable information (PII) of individual(s). For example, an individual's data, as determined from calendar data, can be completely abstracted from any detailed PII of the user (e.g., such as user first name, last name, email address, etc.) by converting or otherwise assigning PII into secure meeting category that does not have PII of any individual. Such features provide a security improvement, i.e., where the removal of PII (e.g., private area features) provides an improvement over prior systems because abstracted or categorized data, especially ones that may be transmitted over a network (e.g., the Internet), are more secure without including PII information of an individual. Accordingly, the systems and methods described herein operate without the need for such essential information, which provides an improvement, e.g., a security improvement, over prior systems. In addition, the use of categorized, modified, or reduced size data allows the underlying system to store and/or process smaller data files, which results in a performance increase to the underlying system as a whole because the smaller data size images require less storage memory and/or processing resources to store, process, and/or otherwise manipulate by the underlying computer system.

In addition, the present disclosure includes specific features other than what is well-understood, routine, conventional activity in the field, and that add unconventional steps that confine the claim to a particular useful application, e.g., machine learning based systems and methods for automatically classifying and/or predicting digital calendar events, as described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 2A illustrates example label data for training a machine learning model of the machine learning based system of FIG. 1, in accordance with various aspects disclosed herein.

FIG. 2B illustrates example feature data for training a machine learning model of the machine learning based system of FIG. 1, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

The present disclosure relates to machine learning based systems and methods for automatically classifying and/or predicting digital calendar events. Such systems and methods comprise use of artificial intelligence (AI), such as machine learning (ML), to classify big data events (e.g., such as digital calendar events) as sourced from one or more data sources, which may include database, cloud-based, or other data sources, such as networked and/or online data sources. Various non-limiting aspects of the present disclosure will now be described to provide an overall understanding of the principles of the function, design and operation of the systems and methods. One or more examples of these non-limiting aspects are illustrated in the accompanying drawings. Those of ordinary skill in the art will understand that the systems and methods described herein and illustrated in the accompanying drawings are non-limiting example aspects and that the scope of the various non-limiting aspects of the present disclosure are defined solely by the claims. The features illustrated or described in connection with one non-limiting aspect may be combined with the features of other non-limiting aspects. Such modifications and variations are intended to be included within the scope of the present disclosure.

Figure 1:
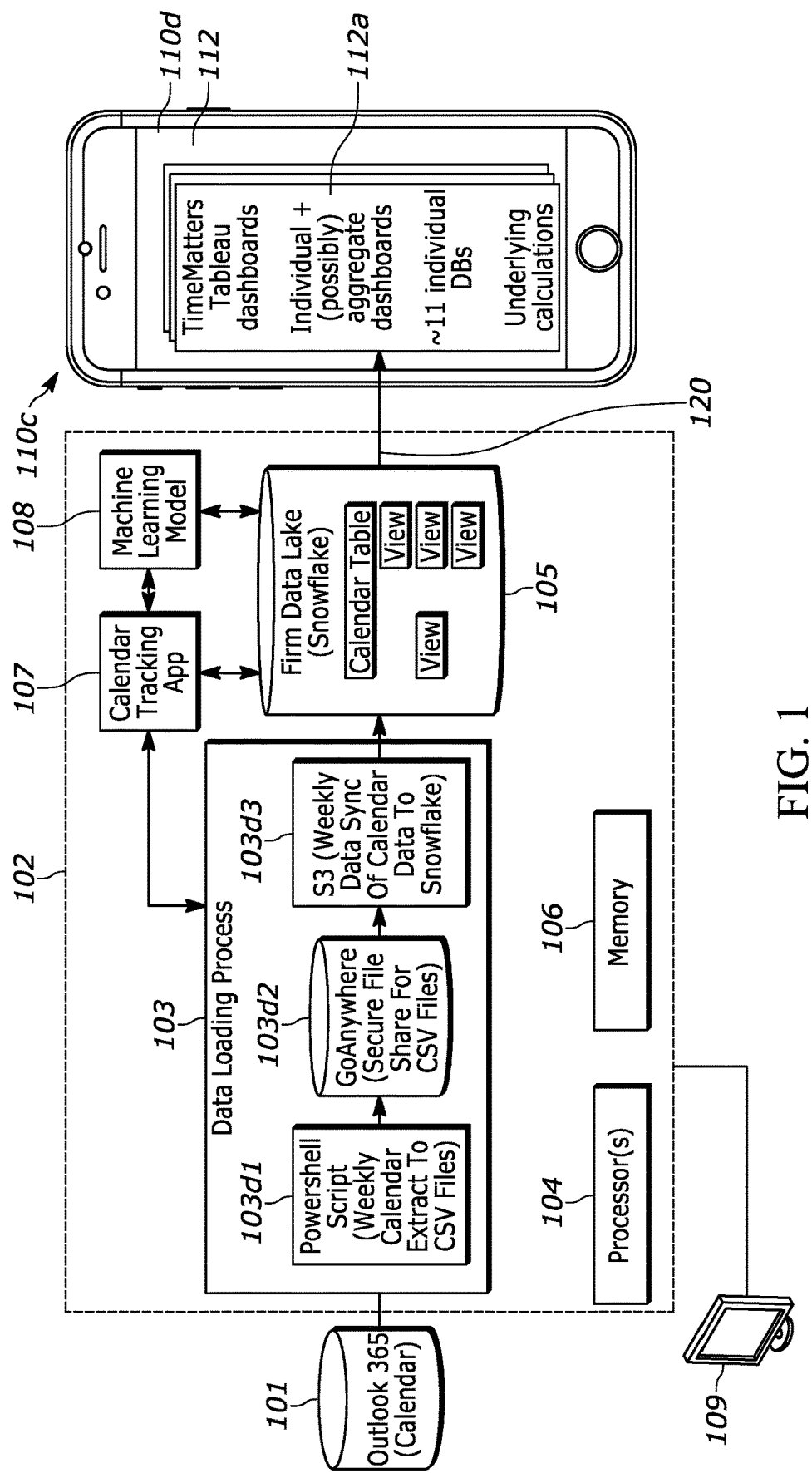
FIG. 1 illustrates an example machine learning based system configured to automatically classify digital calendar events, in accordance with various aspects disclosed herein.

FIG. 1 illustrates an example machine learning based system 100 configured to automatically classify digital calendar events, in accordance with various aspects disclosed herein. FIG. 1 illustrates an example architecture of the machine learning based system 100, which is configured, at least in part, to source or provide data, such as digital calendar events, and related data thereof (e.g., digital calendar data, feature data, label data, and/or other data as described herein) to a machine learning model (e.g., machine learning model 108) for classification and/or prediction as described herein.

In the example aspect of FIG. 1, machine learning based system 100 includes one or more server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memories 106. It is to be understood that the one or more processor(s) 104 and memory 106 may be distributed among the one or more server(s), where multiple server(s), in communication, may operate together to receive, load, execute, and/or analyze computing instructions and/or data as described herein.

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store an artificial intelligence model, such as machine learning model 108, where calendar tracking application (app) 107 may be configured to access or invoke machine learning model 108, and where machine learning model 108 is trained on various meeting categories and/or calendar event data, for example, as described herein.

Data, such as digital calendar events, related digital calendar data, and/or meeting categories, may also be stored memory 106. Additionally, or alternatively, such data may also be stored in one or more databases, such as databases 101, databases of data loading process 103, and/or database 105, which are accessible or otherwise communicatively coupled to server(s) 102. In addition, memory 106 may also store machine readable instructions, including any of one or more application(s) (e.g., calendar tracking app 107 as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 104.

The processor(s) 104 may be connected to the memory 106 via a computer bus responsible for transmitting electronic data, data packets, or otherwise electronic signals to and from the processor(s) 104 and memory 106 in order to implement or perform the machine-readable instructions, methods, processes, elements or limitations, as illustrated, depicted, or described for the various flowcharts, illustrations, diagrams, figures, and/or other disclosure herein. For example, for a given server of server(s) 102, processor(s) 104 may access memory 106 for the given server in order to execute computing instructions as described herein. For example, processor(s) 104 may interface with memory 106 via the computer bus to execute an operating system (OS). Processor(s) 104 may also interface with memory 106 via the computer bus to create, read, update, delete, or otherwise access or interact with the data stored in memory 106 and/or the databases described herein (e.g., a relational database, such as Oracle, DB2, MySQL, or a NoSQL based database, such as MongoDB). The data stored in memory 106 and/or databases may include all or part of any of the data or information described herein, including, for example, data, such as digital calendar events, and related data thereof (e.g., digital calendar data, feature data, label data), and/or other data as described herein.

In general, a computer program or computer based product, application, or code (e.g., machine learning model(s), such as machine learning model 108, calendar tracking app 107, and/or or other computing instructions described herein) may be stored on a computer usable storage medium, or tangible, non-transitory computer-readable medium (e.g., standard random access memory (RAM), an optical disc, a universal serial bus (USB) drive, or the like), such as memory 106, having such computer-readable program code or computer instructions embodied therein, wherein the computer-readable program code or computer instructions may be installed on or otherwise adapted to be executed by the processor(s) 104 (e.g., working in connection with the respective operating system in memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C#, Objective-C, Java, Scala, ActionScript, JavaScript, HTML, CSS, XML, etc.).

Server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, server(s) 102 may include a client-server platform technology such as ASP.NET. Java J2EE, Ruby on Rails, Node.js, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or databases to implement or perform the machine-readable instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102 or may be indirectly accessible via or attached to terminal 109. According to some aspects, an administrator or operator may access the server 102 via terminal 109 to review information, make changes, input training data for training the machine learning model, and/or perform other functions, including those described herein.

In some aspects, server(s) 102 may perform the functionalities as discussed herein as part of a "cloud" network or may otherwise communicate with other hardware or software components within the cloud to send, retrieve, or otherwise analyze data or information described herein.

As shown in FIG. 1, server(s) 102 may be communicatively connected, via computer network 120 to one or more user computing devices, such as computing device 110c. Computing device 110c may be connected to server 102 via a base station, which may comprise a cellular base station, such as a cell tower, communicating via wireless communications based on any one or more of various mobile phone standards, including NMT, GSM, CDMA, UMMTS, LTE, 5G, or the like. Additionally, or alternatively, a base station may comprise routers, wireless switches, or other such wireless connection points communicating with computing device 110c via wireless communications based on any one or more of various wireless standards, including by non-limiting example, IEEE 802.11a/b/c/g (WIFI), the BLUETOOTH standard, or the like.

Computing device 110c is depicted, by way of non-limiting example, as a mobile device for accessing and/or communicating with server(s) 102. Such mobile devices may comprise one or more mobile processor(s) and a display for rendering graphic user interfaces (GUIs). In various aspects, computing device 110c may comprise a mobile phone (e.g., a cellular phone), a tablet device, a personal data assistance (PDA), a computer, a laptop, or the like, including, by non-limiting example, an APPLE iPhone, an iPad device, a GOOGLE ANDROID based mobile phone or tablet, and/or a WINDOWS-based device.

Computing device 110c may comprise one or more processors and/or one or more memories for storing, implementing, or executing computing instructions or code, e.g., a mobile application, as described in various aspects herein. As shown in FIG. 1, a client app (e.g., such as the client app 112a, such as the TABLEAU client app available at the APP STORE platform provided by APPLE) may also be stored locally on a memory of computing device 110c for rendering or display data views as described herein.

Computing device 110c may comprise a transceiver to receive and transmit communications 121 and/or 122 to and server(s) 102. In various aspects, data and/or information (e.g., digital calendar events, and related data thereof (e.g., digital calendar data, feature data, label data, and/or other data as described herein) may be transmitted via computer network 120 to server(s) 102 for machine learning model training, analysis, and/or execution as described herein.

Still further, computer device 110c may include a display screen for displaying graphics, images, text, data, pixels, features, and/or other such visualizations or information as described herein. In various aspects, graphics, images, text, data, pixels, features, and/or other such visualizations or information may be received from server(s) 102 for display on the display screen of a computing device (e.g., computing device 110c). A user computer device may comprise, implement, have access to, render, or otherwise expose, at least in part, an interface or a guided user interface (GUI) (e.g., GUI 112) for displaying text and/or images on its display screen. In various aspects, a display screen (e.g., display screen 110d as described for FIGS. 6-8 herein) can also be used for providing instructions, guidance, and/or visualizations or graphics to the user of a given device (e.g., computing device 110c).

As shown in the example of FIG. 1, machine learning based system 100 is configured to automatically classify digital calendar events. As shown, by way of non-limiting example, calendar data, such as digital calendar events, and related data thereof (e.g., digital calendar data, participant information (such as email address, name, etc.), and/or other data as described herein, which may be used as feature data and/or label data), may be accessed or pulled from a database, such as an OUTLOOK 365 database 101. Such calendar data may include data of past and/or future calendar events of various persons, such as members of a company, organization, or otherwise a group of selected individuals. In some aspects, the calendar data may be selected for a given period, e.g., for a period between July 2021 to December 2021.

With further reference to the example of FIG. 1, server(s) 102 may implement or execute a data loading process 103. In the example, calendar data may be extracted or pulled by execution of a script (e.g., POWERSHELL script 103*d*1) running on processor(s) 104, into one or more files (e.g., CSV files), or otherwise in memory 106. Such extraction or data pull may be performed on a periodic basis, e.g., daily, weekly, monthly, or some other timeframe.

In some aspects, as shown for FIG. 1, the extracted calendar data (e.g., formatted as CSV data) may be stored in a secure file share database (e.g., a GOANYWHERE database 103*d*2).

Still further, in some aspects, the extracted calendar data may be stored on a platform or data base (e.g., S3 platform 103*d*3) to stage such data for periodic (e.g., weekly) synchronization, upload, or otherwise transmission to a further database or platform (e.g., database 105, which is illustrated as a SNOWFLAKE platform database as an example) for analysis by, or training of, a machine learning model (e.g., machine learning model 108).

It is to be understood that data loading process 103 is but one example of loading, receiving, or ingesting calendar data for training a machine learning model (e.g., machine learning model 108), for analyzing and/or outputting data with machine learning model, or for other purposes or uses described herein. Additionally, or alternatively, calendar data (e.g., such as calendar data from database 101) may be provided to a database or platform (e.g., database 105) without the data loading process (e.g., data loading process 103).

Calendar data received or ingested into database 105, or otherwise at server(s) 102, may be used to train a machine learning model and/or produce output by a machine learning model (e.g., machine learning model 108). Such data may be analyzed or operated on by computing instructions (e.g., computing instructions of calendar tracking app 107). In various aspects, calendar tracking application (app) stored in computer memory 106 and comprises computing instructions configured to execute on processor(s) 104. For example, calendar tracking app 107 may receive data from the data loading process 103 and/or database 105, and may format or prepare training data, such as training label data and/or training feature data for training machine learning model. Additionally, or alternatively, calendar tracking app 107 may receive calendar data and input such data into machine learning model 108 to produce an output, such as a classification or prediction as described herein. Still further, additionally, or alternatively, calendar tracking app 107 may execute queries, such as predefined SQL queries (e.g., predefined query 500 as described for FIG. 5), for the generation of data views (e.g., "views" as shown in FIG. 1), and may further provide such data views to computing device 110*c* for display thereon. A client app can read or analyze, and then render, one or more data views on the display screen 110*d* of computing device 110*c* as a GUI. For example, as shown in the example of FIG. 1 a TABLEAU client app 112*a* is able to render one or more data views on GUI 112 of computing device 110*c*. The data views may be rendered as one or more graphical dashboards, and may include text, information, data, and/or graphics based on the calendar data (as sourced from databases 101, 103*d*2, 105, etc.) and/or underlying calculation, analysis, and/or output (e.g., analysis and/or output of machine learning model 108) thereon.

For example, as shown for FIG. 1, calendar tracking app 107 may prepare a calendar table comprising calendar data, e.g., as ingested from data loading process 103, or otherwise from database 101. The calendar table may be used to train machine learning model 108 and/or may be provided as input to machine learning model 108 for providing output, e.g., classifications or predictions, e.g., meeting categories.

With further reference to FIG. 1, machine learning model 108 may be stored on computer memory 106, and may be accessible to calendar tracking app 107. Machine learning model 108 may be trained with a predefined meeting categories as training label data and a plurality digital calendar events as training feature data. For example, Machine learning model 108 may be trained with tens of thousands of calendar events and related data. The data base be formatted or otherwise formulated into the calendar table of database 105, where the data comprises categories according to meeting categories in order to provide a supervised training approach. The output of machine learning model 108 is a meeting category (e.g., such as a predefined meeting category and/or rule-based meeting category) as described herein. Non-limiting examples of predefined meeting categories as training label data, e.g., as used to train machine learning model 108, are described herein for FIG. 2A. Non-limiting examples of digital calendar events and related data as training feature data, as used to train machine learning model 108, are described herein for FIG. 2B.

Machine learning model 108 may be developed, generated, or trained using various software, including the R language and/or Python, which can include a Python-based script running on the AMAZON AWS SAGE MAKER platform. In some aspects, machine learning model 108 may be trained, generated, or otherwise developed with using an XGBoost algorithm in order to handle a large number of features used in the model. XGBoost also provides a balance between predictive accuracy and explainability of the output. In some aspects, XGBoost provides a faster and more training solution compared to other applicable algorithms. In various aspects, machine learning model 108 may be stored (e.g., pickled) on server(s) 102, or otherwise a cloud platform, for access and/or use.

In various aspects, machine learning model 108 comprises an artificial intelligence (AI) based model trained with at least one AI algorithm. Training of machine learning model 108 involves analysis of calendar data to configure weights of the machine learning model 108 used to predict and/or classify meeting categories. For example, in various aspects herein, generation of the machine learning model 108 involves training the machine learning model with the plurality of digital calendar events and/or data thereof. In some aspects, one or more processors of a server or a cloud-based computing platform (e.g., server(s) 102) may receive the plurality of digital calendar events and related data of a plurality of individuals as stored in database 101.

Machine learning imaging model 108 may be trained using a supervised or unsupervised machine learning program or algorithm. In some aspects, machine learning imaging model 108 may employ a neural network, a deep learning neural network, or a combined learning module or program that learns in two or more features or feature datasets (e.g., calendar data). The machine learning model may also include automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on server(s) 102. For example, libraries may include the TENSORFLOW based library, the PYTORCH library, and/or the SCIKIT-LEARN Python library.

Machine learning may involve identifying and recognizing patterns in existing data, such as identifying calendar features (e.g., time of meetings or email addresses) of the calendar event data in order to facilitate making predictions or classifications for subsequent data (such as using the machine learning model on new calendar data in order to output a predicted or classified meeting category).

Machine learning model 108 described herein be generated and trained based upon example data (e.g., "training data") as inputs or data (which may be termed "features" for independent variables, and "labels" for dependent variables) in order to make valid and reliable predictions or classification for new inputs, such as testing level or production level data or inputs. In supervised machine learning, a machine learning program operating on a server, computing device, or otherwise processor(s) (e.g., such as server(s) 102 and/or processor(s) 104) may be provided with example inputs (e.g., "features") and their associated, or observed, outputs (e.g., "labels") in order for the machine learning program or algorithm to determine or discover rules, relationships, patterns, or otherwise generate a machine learning model that map such inputs (e.g., "features") to the outputs (e.g., labels), for example, by determining and/or assigning weights or other metrics to the model across its various features. Such rules, relationships, or otherwise models may then be provided subsequent inputs in order for the model, executing on a server, computing device, or otherwise processor(s) as described herein, to predict or classify, based on the discovered rules, relationships, or model, an expected output, score, or value.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

FIG. 2A illustrates example label data 200 for training a machine learning model (e.g., machine learning model 108) of the machine learning based system of FIG. 1, in accordance with various aspects disclosed herein. Label data 200 may include predefined meeting categories. In the example of FIG. 2A, predefined meeting categories 210 comprises a first example set of meeting categories that are predefined for training a given machine learning model (e.g., Model-1) having labels defined meeting categories, including, "For_Client," "LND." "Me_Time," "Practice," "Travel," "With_Client." "Evaluation," and "Firm & Office." Predefined meeting categories 210 may be used as training label data, that is, label data for training a machine learning model (e.g., machine learning model 108) as described herein. Once trained, the machine learning model 108 may classify calendar data, as determined from calendar event data, into the predefined meeting categories 210.

Further, in the example of FIG. 2A, predefined meeting categories 220 comprises a second example set of meeting categories that are predefined for training a given machine learning model (e.g., Clean_Category model) having labels defined meeting categories, including, "#for_client (CST time)," "#for_client (problem solving)," "#development&learning." "#family&friends," "#health&well-being." "#personal." "#thinking-time," "#knowledge_development," "#practice&function," "#travel&transit," "#with_client (development)," "#with_client (engagement)," "#evaluation," "#governance," and "#office&initiatives." Descriptions 230 provide explanations for each of the predefined meeting categories 220, respectively. For example, "for_client (CST time)" refers to a predefined meeting category that refers to calendar events classified as regular CST calls, CST strategy meetings, and/or preparation, e.g., for LOPs. Predefined meeting categories 220 may be used as training label data, that is, label data for training a machine learning model (e.g., machine learning model 108) as described herein. In one aspect, predefined meeting categories 220 represent clean categories as clubbed from predefined meeting categories 210 to create a second set or update set of meeting categories to train machine learning model 108. Once trained, the machine learning model 108 may classify calendar data, as determined from calendar event data, into the predefined meeting categories 220.

Any one or more of the categories of predefined meeting categories 210, predefined meeting categories 220, or other categories (not shown) may be used as training label data. It is to be understood that additional and/or different categories may also be used as training label data to train machine learning model 108.

FIG. 2B illustrates example feature data 250 for training a machine learning model (e.g., machine learning model 108) of the machine learning based system of FIG. 1, in accordance with various aspects disclosed herein. Feature data 250 may include calendar data extracted or otherwise determined from one or more calendar events. Such calendar data may be sourced, pulled, or otherwise obtained from one or more databases (e.g., database 101) as described herein for FIG. 1. Generally digital calendar events, and related calendar data, may comprise data from a meeting invite or otherwise a calendar event on digital or electronic calendars of individuals of a company or other organization. Such calendar data can include attendee information, such as the number of attendees, internal member(s), external member(s), internal employee career path, career title, or company band or position. Additionally, or alternatively, such calendar data may include meeting and/or meeting subject information comprising keywords. The keywords may be extracted using text analytics. Example keywords may include "ps", "catch-up." "travel." "launch," "steerco," or other key words. Additionally, or alternatively, such calendar data may include meeting time(s) and/or location(s). Such calendar data may comprise weekday data, weekend data, day of meeting data, hour of the day data, meeting duration data, and/or whether the meeting was online (virtual) and/or live (e.g., in person). It is to be understood that additional and/or different features, as selected from calendar data, may also be used for training machine learning model 108.

In the example of FIG. 2B, feature data 250 may include calendar data 260 from one or more calendar events. Calendar data 260 may be sourced, pulled, or otherwise obtained from one or more databases (e.g., database 101) as describe herein for FIG. 1. In the example of FIG. 2B, calendar data 260 is described by descriptions 260, where calendar data 260 includes "N_ATTND_COMPANY_E-MAIL" (the number of attendees with a given company email address), "N_ATTND_W_CLIENT_EMAIL" (number of attendees with a client email address), "N_ATTND_FSP" (number of attendees from a different company cohort), "Feedback" (a keyword in the calendar event data), "duration_minutes" (meeting duration in minutes), "N_ATTND_CSP" (number of attendees from the given company's second cohort), "N_ATTND" (total number of attendees), "N_ATTND_IB6" (employee type), "START_Hour" (meeting start hour), and "N_ATTND_Partner (number of partners attending the meeting)."

Calendar data 260 may be used as training feature data, that is, feature data for training a machine learning model (e.g., machine learning model 108) as described herein. Once trained, the machine learning model 108 may classify calendar data, as determined from calendar event data, into the predefined meeting categories (e.g., predefined meeting categories 210 and/or predefined meeting categories 220, or other meeting categories as described herein).

In some aspects, important features, such as high-gain features for a given machine learning model may be identified. Gain refers to the explanatory or predictive power (e.g., as measured on a percent basis) of a given feature to correctly or accurately predict or classify a given calendar data feature into a given category. Such gain (e.g., gain 280) may be automatically identified as part of an XGBoost algorithm execution. For example, a top 10 high-gain (i.e., important features) is shown for FIG. 2B, where each feature of calendar data 260 is assigned or is otherwise associated with a gain percentage (e.g., 20.2% for the N_ATTND_COMPANY_EMAIL feature). The high-gain features may be selected for a given machine learning model, and are generally selected based on the relative importance (i.e., those having a higher percentage). For example, those having a cumulative 99% value of importance may be kept as features for the machine learning model.

Any one or more of the calendar data 260 may be used as training feature data. It is to be understood that additional and/or different calendar data may also be used as training feature data to train machine learning model 108.

Figure 3:
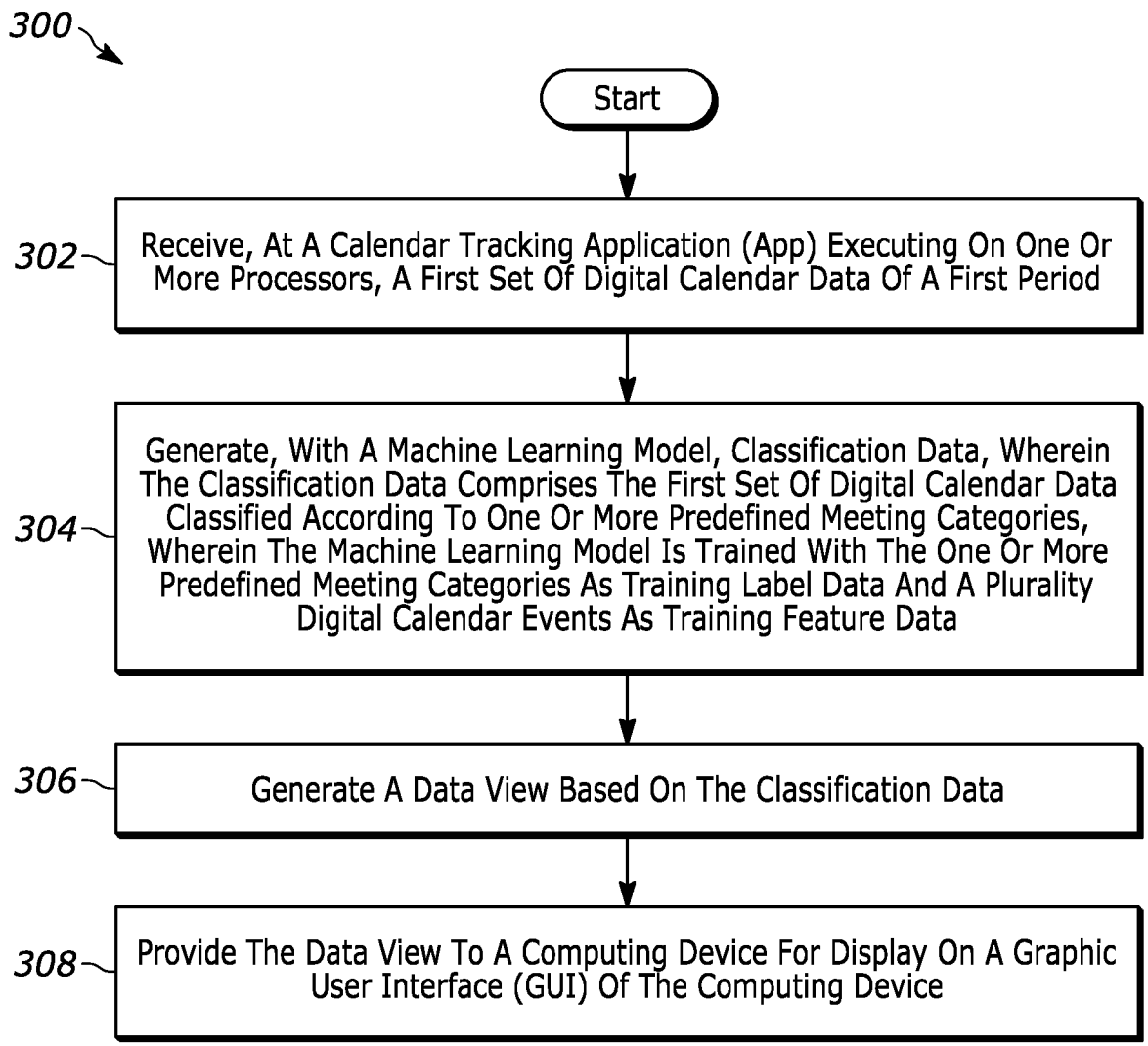
FIG. 3 illustrates an example machine learning based method for automatically classifying digital calendar events, in accordance with various aspects disclosed herein.

FIG. 3 illustrates an example machine learning based method 300 for automatically classify digital calendar events, in accordance with various aspects disclosed herein. At block 302 machine learning based method 300 comprises receiving, at a calendar tracking application (app) (e.g., calendar tracking app 107) executing on one or more processors (e.g., processor(s) 104), a first set of digital calendar data of a first period. As described herein, for example, for FIG. 1, the one or more processors may comprise processor(s) of one or more server(s) or cloud platforms operating to source, pull, or otherwise receive the digital calendar data of one or more digital calendar events, e.g., from data database 101, which may be a MICROSOFT OFFICE 365 database). Such data may be processed, clubbed, or otherwise formatted, and stored as described, for example, for data loading process 103.

At block 304 machine learning based method 300 further comprises generating or otherwise outputting, with a machine learning model (e.g., machine learning model 108), classification data. The classification data may comprise the first set of digital calendar data classified according to one or more predefined meeting categories (e.g., predefined meeting categories 210, predefined meeting categories 220, and/or rule-based meeting categories as described herein). The machine learning model may be trained with the one or more predefined meeting categories as training label data and a plurality digital calendar events as training feature data. That is, the classification data may comprise categories that are classified or otherwise predicted, by a machine learning model (e.g., machine learning model 108), to fall within, align with, or otherwise correspond with the meeting categories that the machine learning model has been trained with. The machine learning model (e.g., machine learning model 108) provides the classification data as output, where the calendar data (e.g., as source from database 101) is provided as input to the machine learning model.

At block 306 machine learning based method 300 further comprises generating a data view based on the classification data. In various aspects, a data view may be a data structure that uniquely defines data, such as data as output from a machine learning model (e.g., machine learning model 108). The data view may be structured or formatted into a variety of data formats including, by way of non-limiting example, a JavaScript Object Notation (JSON) format, a comma separated value (CSV) data, table data, or a propricty data format, e.g., such as a format supported or described for rendering TABLEAU data structures via a TABLEAU native app, e.g., client app 112a. In various aspects, the data view may be a lightweight (i.e., small memory size) data object configured for transmission over a computer network (e.g., computer network 120 of FIG. 1), thereby reducing network congestion.

At block 308 machine learning based method 300 further comprises providing the data view (e.g., via computer network 120) to a computing device (e.g., computing device 110c) for rendering a GUI (e.g., GUI 112) on a display (e.g., display screen 110d) of the computing device. The GUI may be rendered by client app 112a operating on computing device 110c, for example, the TABLEAU client app as operating on a computing device. The small memory size of the lightweight data view also reduces the required memory and required processor utilization of a client device (e.g., computing device 110c) to read or analyze in rendering the data of the data view.

In some aspects, the machine learning model (e.g., machine learning model 108) may be updated or otherwise retrained. For example, in some aspects, computing instructions of the calendar tracking app (e.g., calendar tracking app 107), when executed by one or more processors (e.g., processor(s) 104), may further cause the one or more processors to receive a second set of digital calendar data of a second period. As described herein, for example, for FIG. 1, the one or more processors may comprise processor(s) of one or more server(s) or cloud platforms operating to source, pull, or otherwise receive the second digital calendar data of one or more digital calendar events, e.g., from data database 101, which may be a MICROSOFT OFFICE 365 database. Such data may be processed, clubbed, or otherwise formatted, and stored as described, for example, for data loading process 103.

The second period may comprise a different period of time than the first time period of the first set of calendar data. The time periods may be, by way of non-limiting example, daily, weekly (e.g., every Sunday), monthly (e.g., every 1st day of the month), etc. It should be understood that additional and/or different time periods may be used.

In some aspects, the second set of digital calendar data may be used to update or retrain the machine learning model 108. For example, the second set of digital calendar data may be used as new feature data (e.g., calendar data 260) to retrain machine learning model 108 using predefined meeting categories 210, predefined meeting categories 220, and/or rule-based meeting categories as label training data.

Additionally, or alternatively, the second set of digital calendar data may be provided to machine learning model 108 (e.g., as previously trained) in order to generate new classification data. That is, the second set of digital calendar data may be provided to machine learning model 108 to generate, with the machine learning model 108, second classification data. The second classification data may comprise the second set of digital calendar data classified according to one or more of the predefined meeting categories (e.g., predefined meeting categories 210 and/or predefined meeting categories 220).

The computing instructions of the calendar tracking app (e.g., calendar tracking app 107), when executed by one or more processors (e.g., processor(s) 104), may further cause the one or more processors to generate a second data view based on the second classification data, and provide the second data view to the computing device for display on the GUI (e.g., GUI 112) of the computing device (e.g., computing device 110c). The second data view may be structured or formatted into a variety of data formats including, by way of non-limiting example, a JavaScript Object Notation (JSON) format, a comma separated value (CSV) data, table data, or a propriety data format, e.g., such as a format supported or described for rendering TABLEAU data structures via a TABLEAU native app, e.g., client app 112a. The GUI may be rendered by client app 112a operating on computing device 110c, for example, the TABLEAU client app as operating on a computing device.

It should be understood that digital calendar data (e.g., first set of digital calendar data and/or the second set of digital calendar data) may be split into, or otherwise used for, training data, test data, and/or production data for training machine learning models (e.g., machine learning model 108), retraining such models, or provided to such models as input for producing output, including classification data, predictions, or otherwise as described herein. In addition, digital calendar data comprises data from digital calendar events, for example, as sourced from various individual personal digital calendars. Such calendar information may be sourced from past, present, and/or future calendar events.

Figure 4:
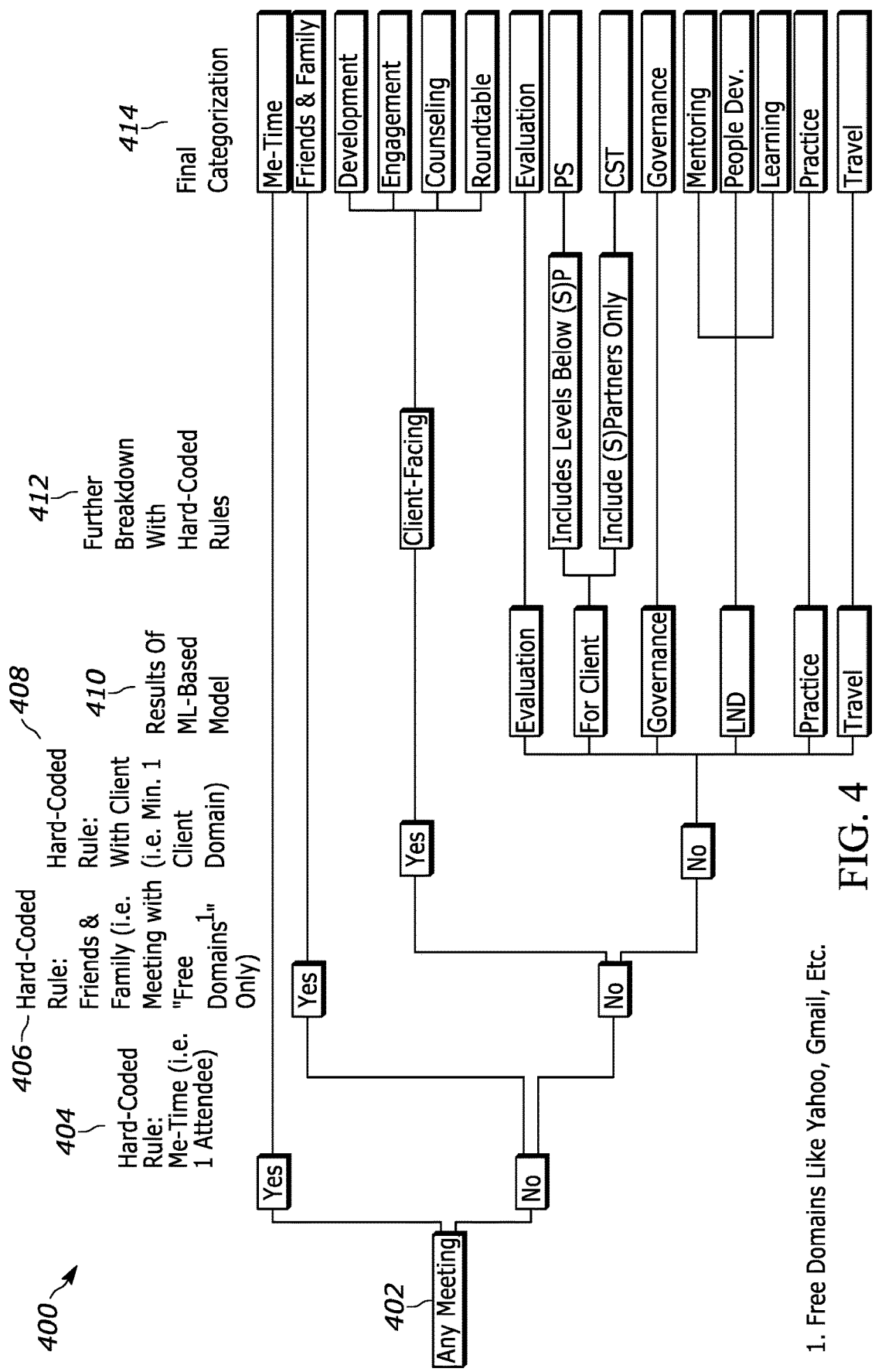
FIG. 4 illustrates an example method for generating rule-based meeting categories, in accordance with various aspects disclosed herein.

FIG. 4 illustrates an example method 400 for generating rule-based meeting categories 410, in accordance with various aspects disclosed herein. Method 400 may be implemented on one or more processors (e.g., processor(s) 104) or otherwise at server(s) 102. In various aspects, method 400 includes sourcing (e.g., from database 101) or analyzing calendar event data (e.g., meeting data 402) to determine one or more rule-based meeting categories. In some aspects, rule-based meeting categories (e.g., rule-based meeting categories 410) may complement (or be in addition to) the predefined meeting categories (e.g., predefined meeting categories 210 and/or predefined meeting categories 220). Additionally, or alternatively, rule-based meeting categories (e.g., rule-based meeting categories 410) may include or be inclusive of predefined meeting categories (e.g., predefined meeting categories 210 and/or predefined meeting categories 220).

For example, as shown for rule-based meeting categories 410, include at least some overlapping categories (e.g., "Me_time" meeting category) with the predefined categories (e.g., predefined meeting categories 210). In the example, of rule-based meeting categories 410, at least some predefined meeting categories 210 have been combined with new meeting categories to generate rule-based meeting categories 410. More generally, the addition, inclusion, or otherwise combination of rule-based meeting categories may result in increased number of categories that may be used as label data for training a machine learning model (e.g., machine learning model 108).

Various rules may be applied to feature data in order to generate or determine rule-based meeting categories (e.g., rule-based meeting categories 410). With reference to FIG. 4, rule-based meeting categories 410 include a "me_time" meeting category, a "friends & family" meeting category, a "development" meeting category, an "engagement" meeting category, a "counseling" meeting category, a "roundtable" meeting category, an "evaluation" meeting category, a "PS" meeting category, a "CST" meeting category, a "governance." a "meeting category," a "mentoring" meeting category, a "people development" meeting category, a "learning/LND" meeting category, a "practice" meeting category" and a "travel" meeting category. It is to be understood, however, that additional and/or different rule-based meeting categories may be defined and/or used, for example, via scripting additional and/or different or otherwise new rules.

With reference to FIG. 4, one or more of rules 404-412 are executed (e.g., by processors 104) to produce rule-based meeting categories 410. Each of rules 404-412 may comprise hard-coded rule and/or machine learning based sub models as determined from pre-scripted code or rules. That is, one or more of ML-based (e.g., rule 412) and/or hard-coded rules (e.g., rules 404 and 406) may be executed for the detailed categorization of meetings into final categories (e.g., rule-based meeting categories 410).

In addition, each of the rules may be ordered or chained such that one rule is applied before another rule such that a digital calendar event may be organized into, predicted to fall within, or otherwise classified into a given meeting category (e.g., rule-based meeting categories 410) based on the chaining and/or otherwise ordering of the specific rules and their respective flow, as illustrated for FIG. 4.

For example, rule 404 comprises a rule for determining whether a meeting or otherwise digital calendar event (e.g., as sourced from database 101) is a single person meeting, therefore, qualify as "me_time," where such digital calendar event was made to allow an individual to block of time for himself or herself.

As a further example, rule 406 comprises a rule for determining whether a meeting or otherwise digital calendar event (e.g., as sourced from database 101) is a family and/or friend meeting, therefore, qualify as a family or friend event where a such digital calendar event identifies or includes "free domains" (e.g., non-company or third-party email domains, such as YAHOO or GMAIL based email domains) indicating that the meeting event included family or friends (e.g., and not company and/or professional organization members).

As a further example, rule 408 comprises a rule for determining whether a meeting or otherwise digital calendar event (e.g., as sourced from database 101) is a client meeting, therefore, qualify as a client based event where a such digital calendar event includes at least one client email domain, and where such calendar event was made to meet with a client, where a client would be a company or organization with which the individual of the calendar event does business with.

As a further example, rule 410 comprises a rule for determining whether a meeting or otherwise digital calendar event (e.g., as sourced from database 101) is a rule-based meeting category identified by the rule as one or more of an "evaluation" type meeting category or otherwise calendar event, a "for_client" type meeting or otherwise calendar event, a "governance" type meeting or otherwise calendar event, an "LND" type meeting or otherwise calendar event, a "practice" type meeting or otherwise calendar event, and/or a "travel" type meeting or otherwise calendar event. In the example of rule 410, these rule-based meeting categories are determined by a machine learning model trained to identify one of these meeting categories based on calendar data of the given calendar events. That is, the calendar data of the digital calendar events may be fed into the rule-based machine learning model as input in order to determine meeting categories (e.g., rule-based meeting categories, such as those described above).

As a further example, rule 412 comprises a rule (e.g., a sub rule) that is applied after existing rules for determining whether a meeting or otherwise digital calendar event (e.g., as sourced from database 101) should be parsed or broken down into sub meeting categories. For example, as shown for rule 412, a sub rule may include analyzing a client-facing meeting to determine or break down whether the client meeting belongs in a "development," "engagement," "counseling," and/or "round table" meeting category. As another example, a further sub rule may include analyzing a client-facing meeting to determine or break down whether a "for_client" meeting belongs in a "PS" (includes levels below a certain job category) or a "CST" (includes partners only) meeting category A machine learning model (e.g., machine learning model 108) may be trained with rule-based meeting categories 410 as label data, and where digital calendar data (as described herein), may be used as feature data. In this way, machine learning model 108 may be trained with one or more meeting categories (e.g., predefined meeting categories 210, predefined meeting categories 220, and/or rule-based meeting categories 410) in order to provide output for various categories generated or determined in different manners.

For example, in various aspects, calendar tracking app (e.g., calendar tracking app 107), when executed by the one or more processors, may further cause the one or more processors to generate rule-based meeting categories (e.g., rule-based meeting categories 410) based on the first set of digital calendar data. The calendar tracking app may then update the machine learning model (e.g., machine learning model 108) based on one or more of the predefined meeting categories and/or the rule-based meeting categories as label data, where the first set of digital calendar data is feature data (or other calendar data as describe herein). A data view (e.g., as described herein for FIGS. 1, 6-8) may then be generated based on the machine learning model as updated and provided to a GUI (e.g., GUI 112) for display on a computing device (e.g., computing device 110*c*).

In some aspects, the computing instructions of the calendar tracking app, when executed by the one or more processors (e.g., processors 104), may cause the one or more processors to update one or more meeting categories by reclassifying one or more digital calendar events of the first set of digital calendar data to be associated with one or more different meeting categories (e.g., any one or more of predefined meeting categories 210, predefined meeting categories 220, and/or rule-based meeting categories 410). The reclassifying can include moving or otherwise assigning some digital calendar events as different digital calendar event types, or moving digital calendar events into sub meeting categories.

Figure 5:
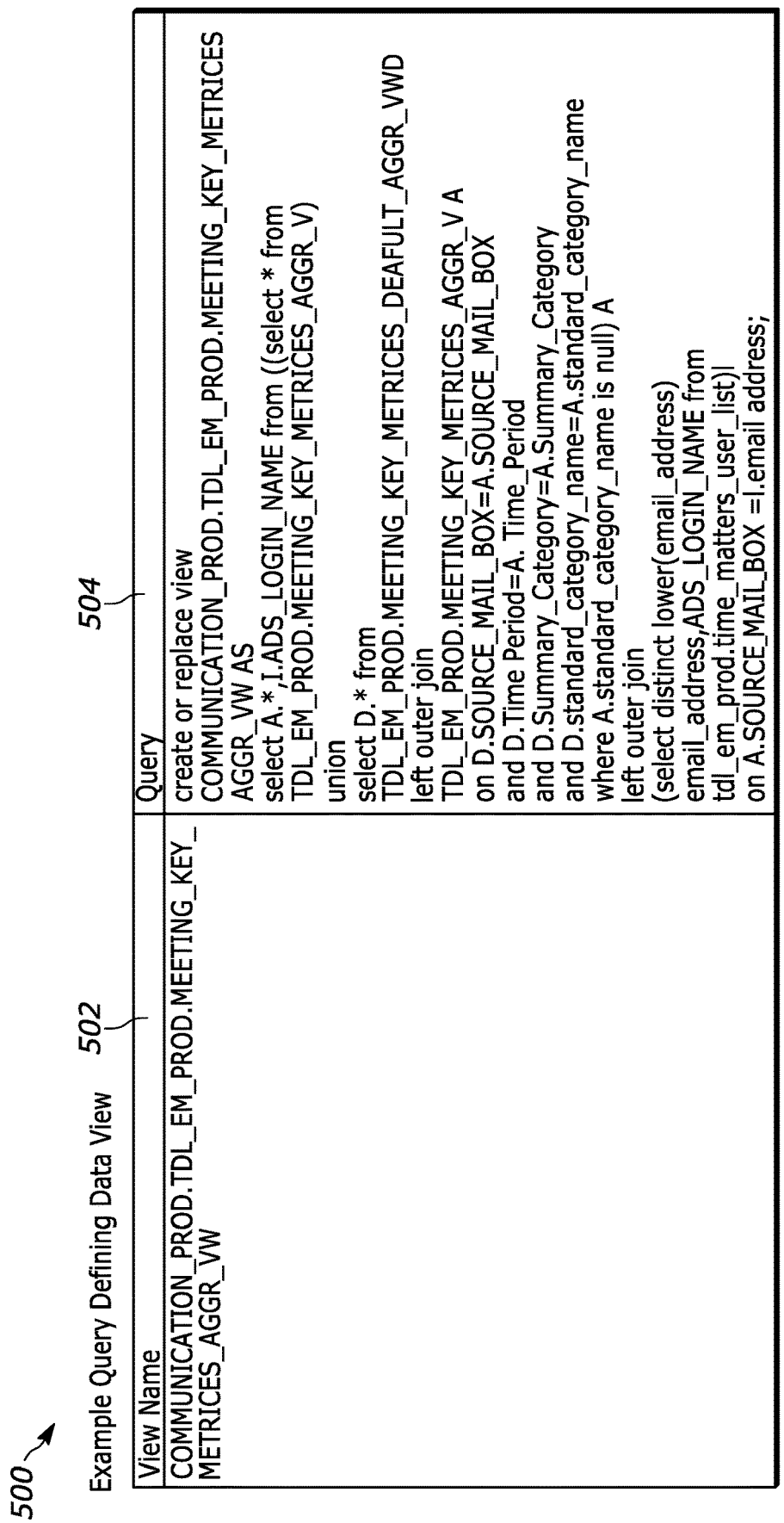
FIG. 5 illustrates an example predefined query for generating a data view, in accordance with various aspects disclosed herein.

FIG. 5 illustrates an example predefined query 500 for generating a data view, in accordance with various aspects disclosed herein. In the example of FIG. 5, a data view generated by predefined query 500 having a view name 502 of "COMMUNICATION_PROD_.TLD_EM_PROD. MEETING_KEY_METRICES_AGGR_VW," which is a name by which the predefined query 500, is identified or stored with in memory (e.g., memory 106). Predefined query 500 may comprise computing instructions 504, which comprise the body of the query, and which may be executed, e.g., by one or more processors (e.g., processors 104) in order to generate a data view.

In some embodiments, and in the example of FIG. 5, predefined query 500 may be a SQL query that, when executed (e.g., by calendar tracking app 107) generates a data view, or data for a data view, as tabular data or output. In the example of FIG. 5, executing of predefined query 500 creates or replaces a data table, in memory (e.g., memory 106) or in database 105 that defines a data view or defines data that may be used to create or format a data view. In the example of FIG. 5, the data or data view is created in memory as a table of data ("MEETING_KEY_METRICS_AGGR_VW") which is a data view created from key metrics from calendar data of a digital calendar event database (e.g., database 101).

The output of executing of predefined query 500 (whether tabular or otherwise) may be provided to a native app, e.g., client app 112*a* as data view. The data view may be formatted as JSON, XML, tabular data, or like for transmission to computing device 110*c* for display thereon via a GUI (e.g., GUI 112). In this way, execution of a compute intensive query (e.g., predefined query 500) on servers 102 creates streamlined data view to be pushed or pulled to or from client app 112*a*, e.g., a TABLEAU client app, and used to generate a GUI (e.g., GUI 112) as shown, for by non-limiting example, for FIGS. 6-8.

Figure 6:
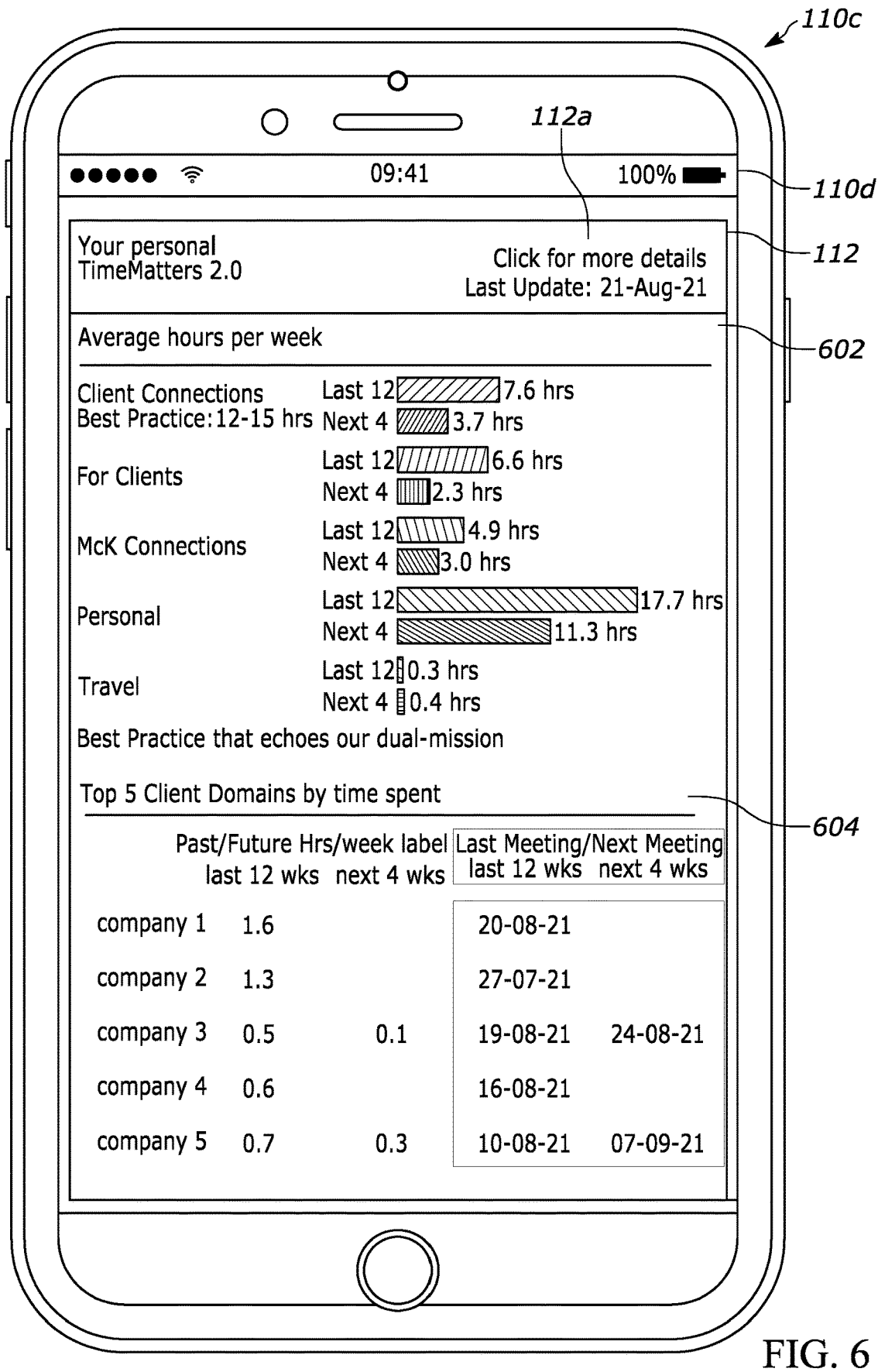
FIG. 6 illustrates an example graphic user interface (GUI) as rendered on a display screen of a computing device and depicting a rendering of a data view, in accordance with various aspects disclosed herein.

FIG. 6 illustrates an example GUI 112 as rendered on a display screen 110*d* of a computing device (e.g., computing device 110*c*) and depicting a rendering of a data view (e.g., a data view as generated by execution of predefined query 500), in accordance with various aspects disclosed herein. For example, as shown in the example of FIG. 6, GUI 112 may be implemented or rendered via an application (app executing on user computing device 110*c*), such as a client app, e.g., client app 112*a* which can be a native app, such as the TABLEAU client app available at the APP STORE platform provided by APPLE. In the example of FIG. 6, computing device 110*c* is a user computer device as described for FIG. 1, e.g., where 110*c* is illustrated as an APPLE IPHONE that implements the APPLE IOS operating system and that has display screen 110*d*. User computing device 110*c* may execute one or more native applications (apps) on its operating system, including, for example, client app 112*a*, such as the TABLEAU client app. That is, client app is configured to render the data view on the GUI in a format native to the client app. Such native apps may be implemented or coded (e.g., as computing instructions) in a computing language (e.g., SWIFT) executable by the user computing device operating system (e.g., APPLE IOS) by the processor of user computing device 110*c*. In various aspects, the client app 112*a*, such as the TABLEAU client app available at the APP STORE platform provided by APPLE executing on a mobile device, such as user computing device 110*c*, may receive data views from server(s)

Figure 7:
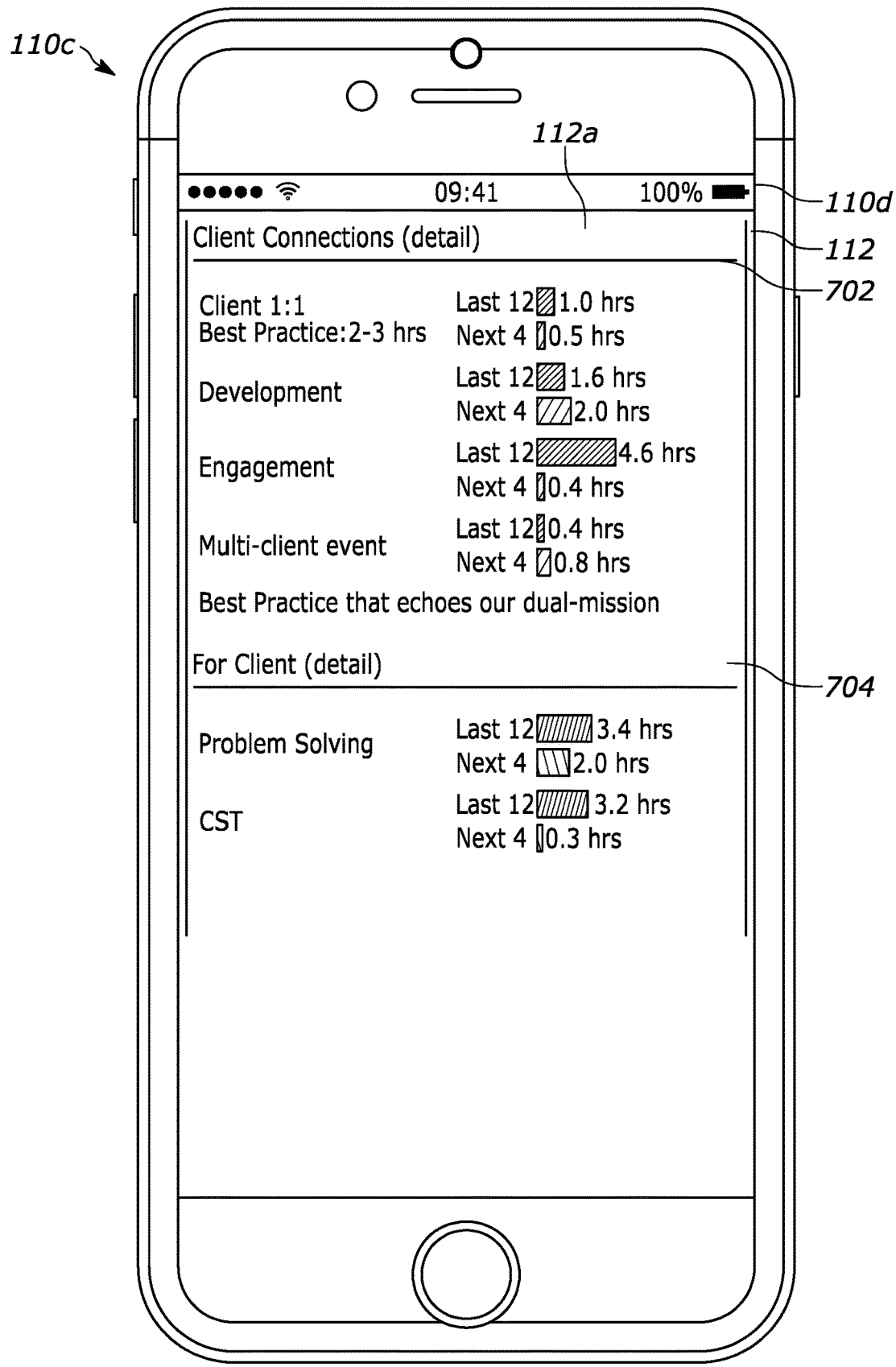
FIG. 7 illustrates a further example the GUI of FIG. 6 as rendered on a display screen of a computing device and depicting a rendering of a data view, in accordance with various aspects disclosed herein.
Figure 8:
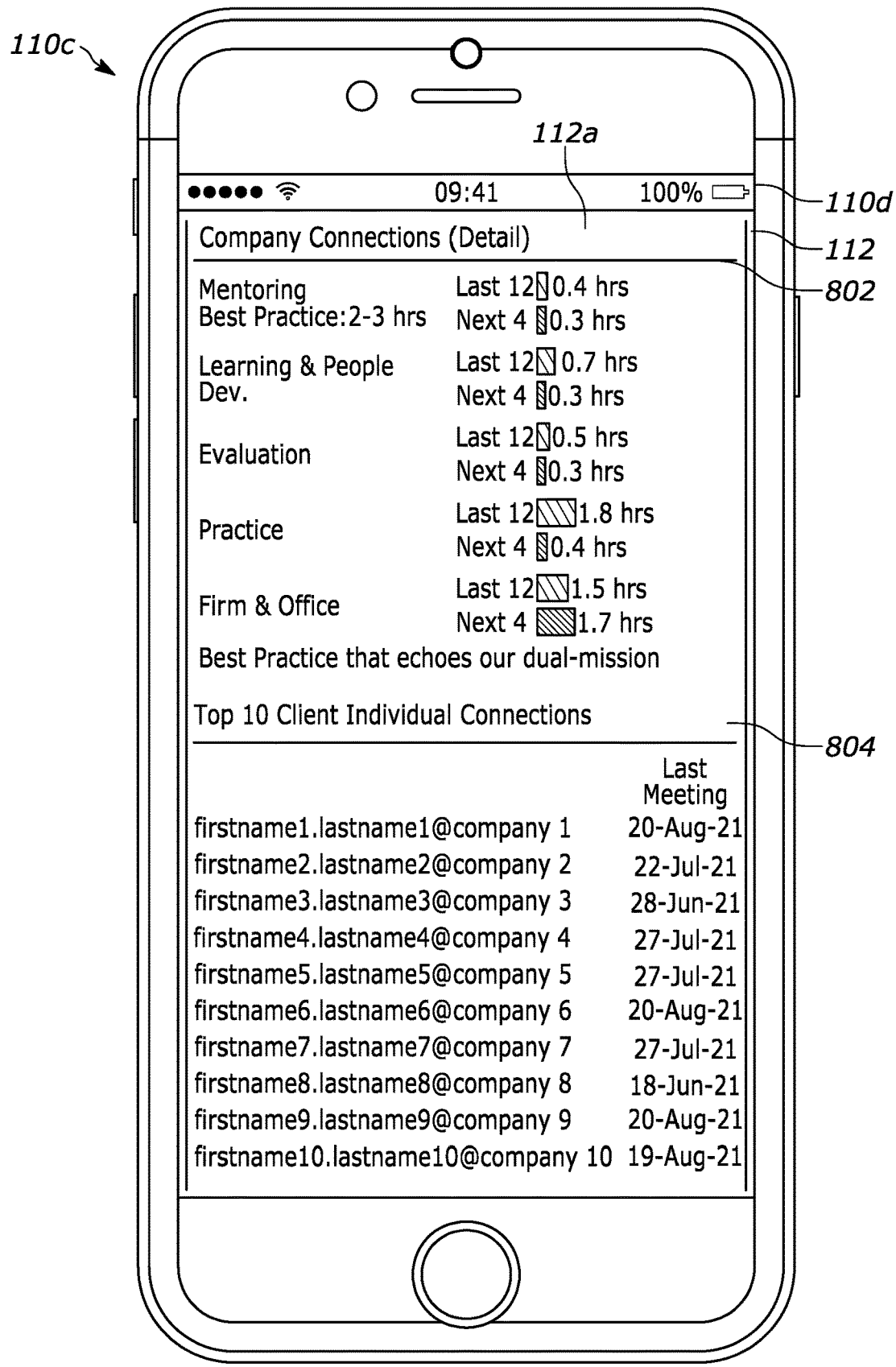
FIG. 8 illustrates a further example the GUI of FIG. 6 as rendered on a display screen of a computing device and depicting a rendering of a data view, in accordance with various aspects disclosed herein.

102, and may render such data views on GUI 112 as shown in FIGS. 6-8, and as otherwise described herein. Such data views may be provided from or pulled from database 105 of server(s) 102, for example, as shown and described for FIG. 1.

The client app may pull data or data views (e.g., from database 105) weekly and/or data or data views may be pushed to client app, e.g., client app 112a. Such data may be pulled or pushed based on a time period or otherwise periodic basis, e.g., daily, weekly, monthly, etc.

Additionally, or alternatively, GUI 112 may be implemented or rendered via a web interface, such as via a web browser application, e.g., Safari and/or Google Chrome app(s), or other such web browser or the like.

In the example of FIG. 6, client app 112a analyzes a data view (e.g., data view as determine from predefined query 500) to render related data for displaying GUI portion 602. GUI portion 602 displays on GUI 112 graphics and text depicting and describing an average hours per week across various categories. The categories may be the label values of the machine learning model (e.g., machine learning model 108) output, which may include any one or more of predefined meeting categories 210, predefined meeting categories 220, and/or rule-based meeting categories 410.

As a further example, client app 112a may analyze a data view (e.g., data view as determined from predefined query 500) to render related data for displaying GUI portion 604. GUI portion 604 displays on GUI 112 graphics and text depicting and describing a top five client domains and time spent per client. The client domains may be determined based on email domains for the clients as determined from the calendar data or otherwise calendar events (e.g., as sourced from database 101). In addition, in some aspects, a user of client app 112a can select, from GUI 112, an option to display a listing of top or core clients (or otherwise important clients or contacts). The selection may cause the listing to be displayed on GUI portion 604 or other area or portion of GUI 112.

As shown in the example of FIG. 6, the data provided and displayed is PII safe, where no PII is displayed, provided, or otherwise transmitted to computing device 110c. Instead, only aggregate or summary data is provided, where any PII would be protected at the server level (e.g., servers 102), from generation of the data view in a secure environment, e.g., on server(s) before transmission to computing device 110c across computer network 120.

FIG. 7 illustrates a further example of GUI 112 as rendered on display screen 110d of a computing device (e.g., computing device 110c) and depicting a rendering of a data view, in accordance with various aspects disclosed herein. In the example of FIG. 7, GUI 112 and display screen 110d may be configured or may otherwise operate as described for FIG. 6.

In the example of FIG. 7, client app 112a analyzes a data view (e.g., data view as determined from predefined query 500) to render related data for displaying GUI portion 702. GUI portion 702 displays on GUI 112 graphics and text depicting and describing client connections detail. The client connections depicts specific categories that may be the label values of the machine learning model (e.g., machine learning model 108) output, which may include any one or more of predefined meeting categories 210, predefined meeting categories 220, and/or rule-based meeting categories 410.

As a further example, client app 112a may analyze a data view (e.g., data view as determine from predefined query 500) to render related data for displaying GUI portion 704. GUI portion 704 displays on GUI 112 graphics and text depicting and describing a "for_client" category detail. The "for_client" detail depicts sub categories for the "for_client" category including activities undertaken on behalf of clients (e.g., problem solving and/or CST) as determined from the calendar data or otherwise calendar events (e.g., as sourced from database 101).

FIG. 8 illustrates a further example of GUI 112 as rendered on display screen 110d of a computing device (e.g., computing device 110c) and depicting a rendering of a data view, in accordance with various aspects disclosed herein. In the example of FIG. 8, GUI 112 and display screen 110d may be configured or may otherwise operate as described for FIG. 6.

In the example of FIG. 8, client app 112a analyzes a data view (e.g., data view as determined from predefined query 500) to render related data for displaying GUI portion 802. GUI portion 802 displays on GUI 112 graphics and text depicting and describing meeting categories related to company specific connection or activities (e.g., mentoring). The company specific connections depicts specific categories that may be the label values of the machine learning model (e.g., machine learning model 108) output, which may include any one or more of predefined meeting categories 210, predefined meeting categories 220, and/or rule-based meeting categories 410.

As a further example, client app 112a may analyze a data view (e.g., data view as determined from predefined query 500) to render related data for displaying GUI portion 804. GUI portion 804 displays on GUI 112 graphics and text depicting and describing top individual clients. These show the email addresses and email domains of clients that are associated with the most calendar events as determined from the calendar data or otherwise digital calendar events (e.g., as sourced from database 101).

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A machine learning based system configured to automatically classify digital calendar events, the machine learning based system comprising:
    one or more processors;
    a computer memory communicatively coupled to the one or more processors;
    a calendar tracking application (app) stored in the computer memory and comprising computing instructions configured to execute on the one or more processors; and
    a machine learning model stored on the computer memory and accessible to the calendar tracking app, the machine learning model trained with a set of training data comprising: (1) a plurality of predefined meeting categories as dependent variables, each dependent variable having a category label, and (2) a plurality of digital calendar events as independent variables, each independent variable having a digital calendar event description, wherein the machine learning model is further trained to classify each of the plurality digital calendar events into at least one of the predefined meeting categories based on a prediction that a given digital calendar event of the plurality digital calendar events corresponds to a given category label of the plurality of predefined meeting categories,
    wherein the computing instructions of the calendar tracking app, when executed by the one or more processors, cause the one or more processors to:
    receive a first set of digital calendar data of a first period, the first set of digital calendar data comprising a first set of calendar events of a user, each calendar event having a digital calendar event description,
    generate, with the machine learning model by inputting the first set of calendar events of the user, classification data, wherein the classification data comprises the first set of calendar events of the user classified according to one or more of the predefined meeting categories,
    generate a data view based on the classification data, wherein the data view is generated as a lightweight data object transferable across a computer network and renderable by the calendar tracking app executing locally on a computing device, and
    provide, over the computer network, the data view to the computing device for rendering a graphic user interface (GUI) on a display of the computing device.

2. The machine learning based system of claim 1, wherein the computing instructions of the calendar tracking app, when executed by the one or more processors, further cause the one or more processors to:
    generate rule-based meeting categories based on the first set of digital calendar data; and
    update the machine learning model based on one or more of the predefined meeting categories and the rule-based meeting categories as label data and the first set of digital calendar data as feature data,
    wherein the data view is generated based on the machine learning model as updated.

3. The machine learning based system of claim 1, wherein the computing instructions of the calendar tracking app, when executed by the one or more processors, further cause the one or more processors to:
    update one or more meeting categories by reclassifying one or more digital calendar events of the first set of digital calendar data to be associated with one or more different meeting categories.

4. The machine learning based system of claim 1, wherein the computing instructions of the calendar tracking app, when executed by the one or more processors, further cause the one or more processors to:
    receive a second set of digital calendar data of a second period, the second period comprising a different period of time than the first period;

generate, with the machine learning model, second classification data, wherein the second classification data comprises the second set of digital calendar data classified according to one or more of the predefined meeting categories, generate a second data view based on the second classification data, and provide the second data view to the computing device for display on the GUI of the computing device.

5. The machine learning based system of claim 1, wherein the data view is generated by a predefined query.

6. The machine learning based system of claim 1, wherein the data view is configured to be received by a client application (app) executing on the computing device, and wherein the client app is configured to render the data view on the GUI in a format native to the client app.

7. A machine learning based method for automatically classifying digital calendar events, the machine learning based method comprising:

receiving, at a calendar tracking application (app) executing on one or more processors, a first set of digital calendar data of a first period, the first set of digital calendar data comprising a first set of calendar events of a user, each calendar event having a digital calendar event description;

generating, with a machine learning model by inputting the first set of calendar events of the user, classification data, wherein the classification data comprises the first set of calendar events of the user classified according to one or more predefined meeting categories, wherein the machine learning model is trained with a set of training data comprising: (1) a plurality of predefined meeting categories as dependent variables, each dependent variable having a category label, and (2) a plurality of digital calendar events as independent variables, each independent variable having a digital calendar event description, wherein the machine learning model is further trained to classify each of the plurality digital calendar events into at least one of the predefined meeting categories based on a prediction that a given digital calendar event of the plurality digital calendar events corresponds to a given category label of the plurality of predefined meeting categories;

generating a data view based on the classification data, wherein the data view is generated as a lightweight data object transferable across a computer network and renderable by the calendar tracking app executing locally on a computing device; and providing, over the computer network, the data view to the computing device for rendering a graphic user interface (GUI) on a display of the computing device.

8. The machine learning based method of claim 7 further comprising:

generating rule-based meeting categories based on the first set of digital calendar data; and updating the machine learning model based on one or more of the predefined meeting categories and the rule-based meeting categories as label data and the first set of digital calendar data as feature data, wherein the data view is generated based on the machine learning model as updated.

9. The machine learning based method of claim 7 further comprising:

updating the data view by reclassifying one or more digital calendar events of the first set of digital calendar data to be associated with one or more different meeting categories.

10. The machine learning based method of claim 7 further comprising:

receiving a set receive a second set of digital calendar data of a second period, the second period comprising a different period of time than the first period;

generating, with the machine learning model, second classification data, wherein the second classification data comprises the second set of digital calendar data classified according to one or more of the predefined meeting categories, generating a second data view based on the second classification data, and providing the second data view to the computing device for display on the GUI of the computing device.

11. The machine learning based method of claim 7, wherein the data view is generated by a predefined query.

12. The machine learning based method of claim 7, wherein the data view is configured to be received by a client application (app) executing on the computing device, and wherein the client app is configured to render the data view on the GUI in a format native to the client app.

13. A tangible, non-transitory computer-readable medium storing computing instructions for automatically classifying digital calendar events, that when executed by one or more processors cause the one or more processors to:

receive, at a calendar tracking application (app) executing on one or more processors, a first set of digital calendar data of a first period, the first set of digital calendar data comprising a first set of calendar events of a user, each calendar event having a digital calendar event description;

generate, with a machine learning model by inputting the first set of calendar events of the user, classification data, wherein the classification data comprises the first set of calendar events of the user classified according to one or more predefined meeting categories, wherein the machine learning model is trained with a set of training data comprising: (1) a plurality of predefined meeting categories as dependent variables, each dependent variable having a category label, and (2) a plurality of digital calendar events as independent variables, each independent variable having a digital calendar event description, wherein the machine learning model is further trained to classify each of the plurality digital calendar events into at least one of the predefined meeting categories based on a prediction that a given digital calendar event of the plurality digital calendar events corresponds to a given category label of the plurality of predefined meeting categories;

generate a data view based on the classification data, wherein the data view is generated as a lightweight data object transferable across a computer network and renderable by the calendar tracking app executing locally on a computing device; and provide, over the computer network, the data view to the computing device for rendering a graphic user interface (GUI) on a display of the computing device.

14. The tangible, non-transitory computer-readable medium of claim 13, wherein the computing instructions, when executed by the one or more processors, further cause the one or more processors to:

generate rule-based meeting categories based on the first set of digital calendar data; and update the machine learning model based on one or more of the predefined meeting categories and the rule-based meeting categories as label data and the first set of digital calendar data as feature data, wherein the data view is generated based on the machine learning model as updated.

15. The tangible, non-transitory computer-readable medium of claim 13, wherein the computing instructions, when executed by the one or more processors, further cause the one or more processors to:
update one or more meeting categories by reclassifying one or more digital calendar events of the first set of digital calendar data to be associated with one or more different meeting categories.

16. The tangible, non-transitory computer-readable medium of claim 13, wherein the computing instructions, when executed by the one or more processors, further cause the one or more processors to:
receive a set receive a second set of digital calendar data of a second period, the second period comprising a different period of time than the first period;
generate, with the machine learning model, second classification data, wherein the second classification data comprises the second set of digital calendar data classified according to one or more of the predefined meeting categories,
generate a second data view based on the second classification data, and
provide the second data view to the computing device for display on the GUI of the computing device.

17. The tangible, non-transitory computer-readable medium of claim 13, wherein the data view is generated by a predefined query.

18. The tangible, non-transitory computer-readable medium of claim 13, wherein the data view is configured to be received by a client application (app) executing on the computing device, and wherein the client app is configured to render the data view on the GUI in a format native to the client app.

* * * * *